W. HAMILTON.
Churn.
No. 31,715.
Patented March 19, 1861.
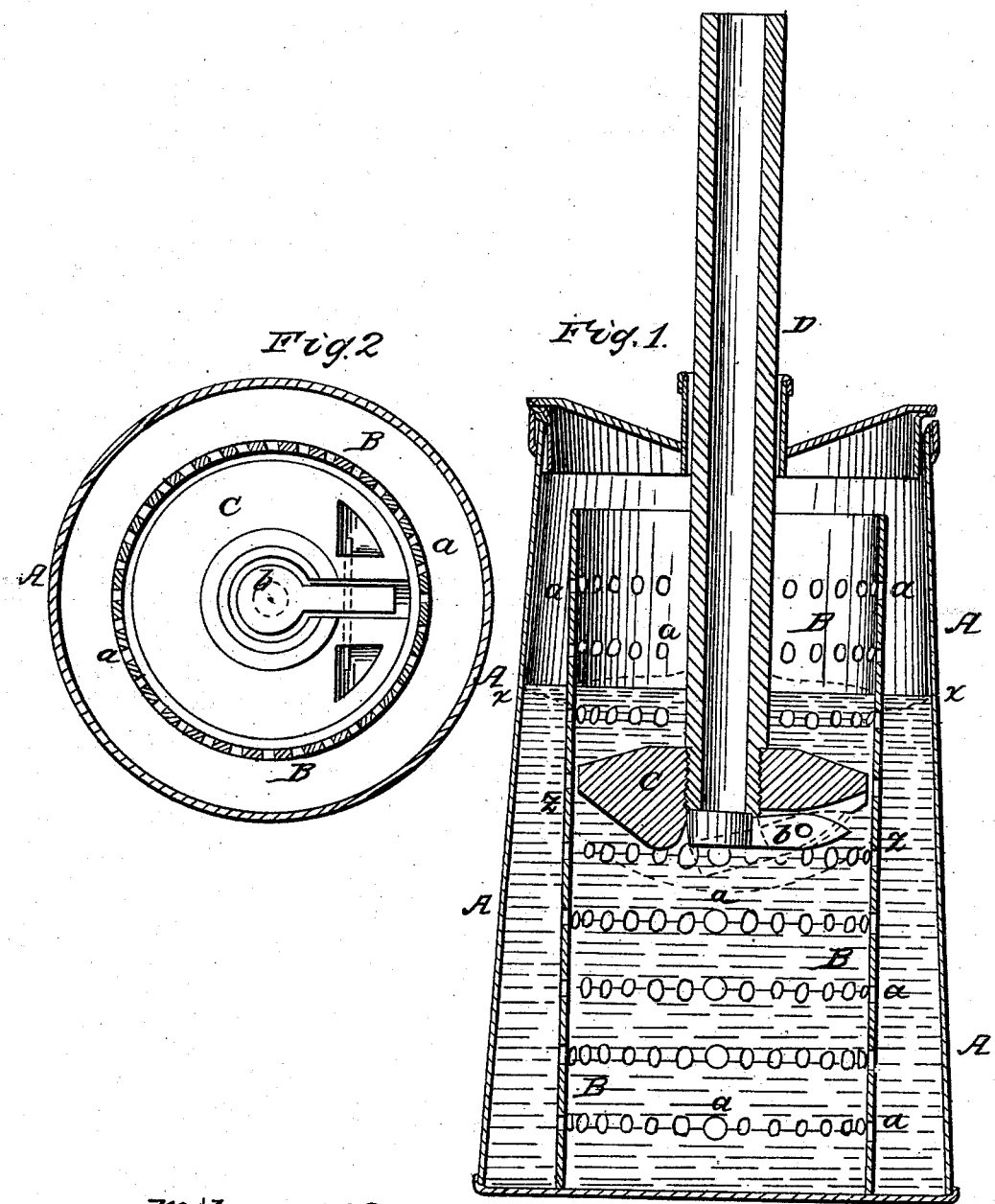
Witnesses
W. Fairfax
Amos Broaang
Inventor
William Hamilton by
A. Pollak his atty

UNITED STATES PATENT OFFICE.

WM. HAMILTON, OF ST. CATHARINE, MISSOURI.

CHURN.

Specification of Letters Patent No. 31,715, dated March 19, 1861.

*To all whom it may concern:*

Be it known that I, WILLIAM HAMILTON, of St. Catharine, in the county of Linn and State of Missouri, have invented a new and useful Improvement in Churns, of which the following, in connection with the accompanying drawing, is such a full and clear description as to enable others skilled in constructing and working churns to make and use this my invention.

It is well known to dairymen and others that butter produced in the least possible time from a given quantity of cream or milk is much superior in grain and quality, besides a saving in yield, to that obtained at a greater expense of time and labor. My improved churn accomplishes this desideratum in the most perfect possible manner. In it I employ the forced admission of atmospheric air within the cream or milk, the beneficial effect of which is well known and has been the object aimed at by numerous atmospheric churns, but I do this by creating a partial void at successive periods in the body of the milk, by a novel combination of means, and cause the incoming air to act with great force upon the milk so as to thoroughly permeate and break it. In it, I also avail myself of the well known fact that, butter in cream or milk is contained in minute sacks or globules, which under a given temperature burst on the application of pressure and allow the oil or butter to escape and concentrate, and that a sudden and forcible breaking of the current or currents of milk, by causing the dasher to abruptly throw the latter against the sides of the churn or other opposing surface or body, largely favors the perfect and rapid formation of butter; and this I accomplish in a novel and superior manner. In this my churn also, I cause the action to be simultaneous upon the whole body of milk in it, so as to obviate the necessity of continuing the working of the churn for a lengthened period which not only injures the quality of the butter and often results in actual loss, but which likewise involves a great expense of time and labor. From three to five minutes or thereabout suffices to churn a mass of cream or milk and make superior butter by this my improvement. Butter may be produced from good cream by it in two minutes.

In the accompanying drawing Figure 1 represents a vertical sectional elevation of a churn constructed according to my improvement; Fig. 2 is a transverse section of the same seen from beneath.

In these figures, A represents the outer case or tub of the churn provided with a suitable lid, though a cover is not an absolutely necessary feature. This outer case is assumed to occupy a vertical position, and has arranged within it an inner cylinder or case (B) of suitable depth and of such diameter as to leave an annular or other shaped space between it and the interior sides of the outer case (A). Said inner cylinder has its sides or circumference perforated with a number of openings (a) so as to establish a broken communication between the two cylinders or cases (A and B). Within this perforated inner cylinder (B) is arranged, to play up and down in the manner of a piston, a plunger dasher (C) which has connected with it and is worked by a hollow stem or shaft (D) open top and bottom. Any proper handle or operating mechanism may be attached to this hollow staff to facilitate the working of the dasher.

The dasher (D) is provided with any suitable valve (b) or valves, arranged to open during the ascent of the dasher and to close during its descent, so as to shut and open alternately the air passage in or through the dasher and its staff. One or both faces of the dasher I prefer to make convex or otherwise of equivalent beveled configuration to give to the dasher a lateral thrust or action upon the milk to urge its flow through the perforated side or sides of the inner cylinder. Now, it will readily be perceived, on working the dasher rapidly up and down, that the dasher being immersed or submerged in the milk, will in its ascent cause a partial void below it by reason of the milk in or from the outer case not flowing through the perforations (a) of the inner cylinder with sufficient rapidity to follow up the speed of the dasher. At least this is the tendency and the amount or degree of void or vacuum below the dasher will depend mainly upon the speed of the dasher and area of opening formed by the perforations (a) combined with the quantity and consistency of the cream or milk in the churn. This tendency or action then causes the valve (b) to open and admit air from the outside into the space below the dasher. On the descent of the dasher said valve closes, and such admitted fresh air is forcibly made to permeate the body of milk and to abruptly counteract its tendency to fill the partial void below the dasher. Thus the introduced atmospheric air not only exerts a beneficial chemical effect upon the cream or milk, but acts mechanically to break the current or currents in a most perfect manner. Supposing the line ($x\ x$) to represent the upper level of milk in the churn, the line ($z\ z$) may represent its lower or broken level in the inner cylinder at a given point in the ascent of the dasher, which illustration will serve to explain the formation of the partial void below the dasher. But, this is not the sole action that takes place upon the mass of milk in the churn, and apart from direct impact of the dasher with it, the milk is further agitated and worked in and out alternately of the inner and outer cylinders (A and B) and forcibly and abruptly dashed against the sides of the churn and its courses of motion suddenly broken and changed by the reverse or reciprocating action of the dasher. Thus there is both an alternate reverse vertical action on or of the mass and a series of short transverse or horizontal courses alternately in reverse directions and a simultaneous action on or agitation of the milk takes place throughout the whole body or mass, which effect is further secured and the agitation of the whole mass throughout made more regular and equable by the pressure put upon the milk of the air introduced by the dasher in the effort of such air to permeate the mass. The forcible working of the milk in and out of the perforated cylinder and the abrupt dashing of it against the sides of the churn in a series of independent courses would obviously be a good working arrangement without the atmospheric air supply furnished by the hollow dasher or its equivalent, but, when combined with said atmospheric feature, the advantage is materially increased, the reciprocating plunger or its equivalent being in either case, a necessary element.

In this my churn, there is no complication of parts or actions, hence it may be got up cheap and is not liable to get out of repair and affords every facility for cleansing and for collecting the butter, which latter may be done by removing the inner cylinder and giving the dasher a few gentle strokes; but its rapid production of butter of superior quality is its leading characteristic.

Having now described my invention I claim as new and useful therein:

In churns employing a reciprocating plunger or dasher having a hollow staff and valve for the admission of atmospheric air as described, and having the dasher cylinder arranged within a tub or case forming a milk space between it and the dasher cylinder, I claim the use of a reticulated dasher cylinder or inner case so perforated as that a constant communication is established through the meshes of the inner cylinder between the inner and outer cylinders both above and below the dasher in the double movement of the latter essentially as herein set forth.

In testimony whereof I have signed my name to this specification before two subscribing witnesses.

WM. HAMILTON.

Witnesses:
B. F. PARSONS,
W. L. SALISBURY.